United States Patent [19]

Pohle

[11] Patent Number: 5,983,949

[45] Date of Patent: *Nov. 16, 1999

[54] NON-ALPHA-NUMERIC CODING OF LONG FLEXIBLE ITEMS

[76] Inventor: Richard H. Pohle, RR 1 Box 426, Kula Maui, Hi. 96790

[ * ] Notice: Under 35 U.S.C. 154(b), the term of this patent shall be extended for 776 days.

[21] Appl. No.: 08/490,203

[22] Filed: Jun. 14, 1995

Related U.S. Application Data

[63] Continuation-in-part of application No. 08/027,886, Mar. 8, 1993, abandoned.

[51] Int. Cl.⁶ .................................................... F16L 55/00
[52] U.S. Cl. .......................... 138/104; 138/146; 138/178
[58] Field of Search .................................. 138/104, 146, 138/178

[56] References Cited

U.S. PATENT DOCUMENTS

| | | | |
|---|---|---|---|
| D. 14,451 | 11/1883 | Pond | D13/153 |
| Re. 30,393 | 9/1980 | Sherlock | 174/37 |
| 802,800 | 10/1905 | Dolan et al. | 138/178 |
| 1,935,970 | 11/1933 | Wooster et al. | 116/114 |
| 1,982,304 | 11/1934 | Holden | 28/1 |
| 2,449,265 | 9/1948 | Williams | 138/49 |
| 2,487,064 | 11/1949 | Marsh | 201/63 |
| 2,602,233 | 7/1952 | Irving | 33/137 |
| 2,809,458 | 10/1957 | Wilbourn | 43/1 |
| 2,920,393 | 1/1960 | Schoenfeldt | 33/138 |
| 3,034,943 | 5/1962 | Cravotta | 138/178 |
| 3,752,617 | 8/1973 | Burlis et al. | 425/131 |
| 4,119,123 | 10/1978 | Samuels | 138/122 |
| 4,275,768 | 6/1981 | Riggs et al. | 138/104 |
| 4,383,555 | 5/1983 | Finley | 138/122 |
| 4,401,145 | 8/1983 | Hausch | 152/353 R |
| 4,416,309 | 11/1983 | Salim | 138/104 |
| 4,844,000 | 7/1989 | Clement | 116/205 |
| 5,017,873 | 5/1991 | Rippingale et al. | 324/326 |
| 5,415,203 | 5/1995 | Huang | 138/104 |

*Primary Examiner*—James F. Hook
*Attorney, Agent, or Firm*—Victor R. Beckman

[57] ABSTRACT

A long flexible member which is subject to tangling is provided with a non-alpha-numeric code such as a color, textural, or design code, which code is used as an aid in untangling the item by providing a rough estimation of separation of sections along the length of the item. The code changes substantially continuously from one end of the member to the other and helps to identify which sections of the item may be close together. Untangling of the member is greatly facilitated by the code.

15 Claims, 2 Drawing Sheets

EACH COLOR CONTINUOUSLY CHANGES IN ONE OR MORE ATTRIBUTES SUCH AS HUE, BRILLIANCE, SATURATION OR PURITY

COLORS OF 32,34 AND 36 EACH CONTINUOUSLY CHANGE IN ONE OR MORE ATTRIBUTES SUCH AS HUE, BRILLIANCE, SATURATION OR PURITY

EACH COLOR CONTINUOUSLY CHANGES IN ONE OR MORE ATTRIBUTES SUCH AS HUE, BRILLIANCE, SATURATION OR PURITY

NON-ALPHA-NUMERIC CODING OF LONG FLEXIBLE ITEMS

RELATED APPLICATION

This is a continuation-in-part application of U.S. patent application Ser. No. 08\027,886, filed Mar. 8, 1993, now abandoned entitled "Non-Alpha-Numeric Coding of Long Flexible Items" by the present inventor, Richard H. Pohle.

BACKGROUND OF THE INVENTION

1. Field of the Invention

Long flexible items such as ropes, hoses, extension cords, and the like, are generally sold to consumers wound in a coil of a predetermined length (e.g. 100 feet) with loops wrapped around the coils to keep them from tangling. Upon first use, the item is generally stretched out to its full length. When the item is rewound for storage or otherwise gathered together, the coils often become mixed so that the coils become tangled when stretching them out for subsequent use. A common cause of a tangle is that one coil forms a loop which is encircled by a second coil. A large tangle will contain many of these or similar situations in a complex mass. Often, simply pulling on one end of the tangled item will not suffice to stretch it out to its full length but merely tightens the coil around the loop into a knot or a series of knots. The correct procedure for untangling the item is to pull the loop out of the coil and to separate coils from different sections of the item. Often, cursory inspection of the tangle does not immediately identify the loop from the mass of coils and loops forming the tangle and does not aid in the separation of the various sections of the item. The present invention allows immediate identification of coils so that those that are tangled are readily identified, and untangling thereof may proceed expeditiously.

2. Description of Related Art

The prior art contains examples of means such as indicia extending along the length of a pipe, hose, or the like. For example, U.S. Pat. No. 2,487,064 shows a heating element which is visibly marked at successive points there along whereby it may be selectively cut to a length to provide a selected electrical resistance. U.S. design Pat. No. 14,451 shows an electrical conductor which is divided into sectional bands, or zones of different shades of color. U.S. Pat. No. 5,017,873 shows a fiber optic cable with a magnetic marker comprising magnetized magnetic material for use in locating the cable when buried. U.S. Pat. No. 3,752,617 shows a tube having different characteristics along its length. U.S. Pat. No. 1,982,304 shows a line having a series of sections or bands of color for use in determining the length of a cast. U.S. Pat. No. 2,920,393 shows a starting cord for an outboard motor with indicia for indicating uniform predetermined distances there along. U.S. Pat. No. 2,602,233 shows a measuring line with differently colored sections there along. U.S. Pat. No. 2,809,458 shows a fishing line having linear sections of different colors arranged in order of intensity of visibility for use in turbid waters. U.S. Pat. No. 1,935,970 shows a continuous towel with a diagonally positioned stripe for use in indicating quantity of towel remaining in a towel dispenser. U.S. Reissue Pat. No. Re 30,393 shows a plastic pipe construction which includes a metallic strip that is either wound around the pipe in a spiral fashion, or runs linearly along the length of the pipe. When buried, metal detector means may be used to locate the metallic strip and plastic pipe. U.S. Pat. No. 2,449,265 shows a radiator hose which is marked with numerals and lines along the length thereof to guide in cutting at selected points from the hose ends. U.S. Pat. No. 4,416,309 shows a rigid pipe having alpha-numeric indicia extending there along, which indicia allow for determination of the end and center of the pipe as a guide to excavation. U.S. Pat. No. 4,844,000 shows a fire hose that includes direction indicating clamps at spaced distances there along which clamps point toward the direction out of a building. The clamps allow fire fighters trapped in a building to determine the direction to the outside. U.S. Pat. No. 4,119,123 shows a flexible hose with a wear-indicating helical ridge that protrudes above the surface of the hose. The wear of the ridge serves as an indication of hose wear. U.S. Pat. No. 4,275,768 shows a hose that is provided with a longitudinally extending indicia strip in which a trademark or other information conveying indicia may be engraved. U.S. Pat. No. 4,401,145 shows a process for application of indicia to elastomer substrates at ambient temperature. Some of the above-mentioned prior art pipes and hoses are rigid, or semi-rigid, and, therefore, are not capable of tangling. Consequently, any associated means such as indicia, strip, or the like, does not function as an aid to untangling. Of prior art long flexible members that are capable of tangling, none include a non-alpha-numeric code which continuously changes non-repetitively from one end of the member to the other end for uniquely identifying position at substantially every point along the length of the member by means of which code tangled coils located anywhere along the length of the member may be readily identified and, therefore, may be readily untangled.

SUMMARY OF THE INVENTION

An object of this invention is the provision of a non-alpha-numeric coded item comprising a long flexible member which is subject to tangling when uncoiling, the tangled coils and loops of which member are readily identifiable so as to facilitate untangling of the member.

In accordance with the present invention, an elongated item subject to tangling is provided with a visible, non-alpha-numeric code that extends substantially from one end to the other of the item. The code substantially continuously changes non-repetitively from one end of the item to the other for uniquely identifying position at substantially every point along the length of the item. With the present code, substantially every point along the item is readily distinguishable from every other point. Consequently, loops and coils included in the tangled item are readily identifiable. Once identified, it is a simple matter to extract loops from surrounding coils that produce the tangle, which loop extraction is continued until the item is completely untangled.

Long flexible members for use with this invention include, but are not limited to, ropes, hoses, extension cords, and the like, which are of substantially circular cross-sectional shape. The code used in conjunction with the long flexible member does not rely upon alpha-numeric characters, or the like, which must be visible, e.g. sufficiently clean as to be identified, or which must be deciphered, e.g. read and subtracted to determine whether adjacent sections of the tangled item form a loop. The present invention includes non-alpha-numeric indicia for use in determining approximate separation between portions of the elongated flexible item. Since the indicia of the present invention substantially continuously changes non-repetitively, it also can be used to determine the direction to either end and the location of the opposite ends of the elongated item.

Various non-alpha-numeric coding schemes may be used in practice of the present invention to denote the relative position of sections of the long flexible item. In one embodiment of the invention color may be employed in the manifestation of the code. At least one attribute of the color substantially continuously changes along the item from substantially one end to the other. If desired, a plurality of different colors, such as colors of the rainbow, may be used, which colors may correspond in sequence to the colors of the rainbow. Each color of the plurality of colors substantially continuously changes non-repetitively whereby substantially every point along the length of the item is uniquely identified thereby facilitating untangling the item. Alternatively, the code may be manifested in a design which substantially continuously changes as the position thereof on the long flexible member proceeds from one end to the other. For example, the member may be provided with one or more longitudinally extending bands that taper in width from one end of the member to the other. If more than one band is employed, the taper of each would extend in the same direction. If desired, the tapered band design may be helically formed on the member. Also, the code may be manifested in a substantially continuous change in pitch of a helical band extending from one end of the elongated flexible item to the other end. Furthermore, a textural code may be employed wherein texture substantially continuously changes as the position of the code on the elongated member proceeds from one end to the opposite end. For example, the texture may continuously change from smooth to rough from one end to the other of the long flexible member. The continuous change in texture may be both visually and tactually perceived, or sensed. A combination of visual and textural codes may be employed.

Significant savings in time and temper would be realized if commonly used items prone to tangling such as ropes, hoses, extension cords, and the like, were provided with a visual and/or tactile aid for the sometimes hit or miss process of disentangling and separating loops and coils of the item. With the present invention, the visual and/or tactile coding applied to the item provides a guide as to where to push or pull and aids the decipherment of the tangle.

The above and other objects, features and advantages of the present invention will be better understood from the following description in view of the drawings. It here will be understood that the drawings are for purposes of illustration only and not by way of limitation.

BRIEF DESCRIPTION OF THE DRAWINGS

In the drawings, wherein like reference numerals refer to the same parts in the several views.

Figure 1:
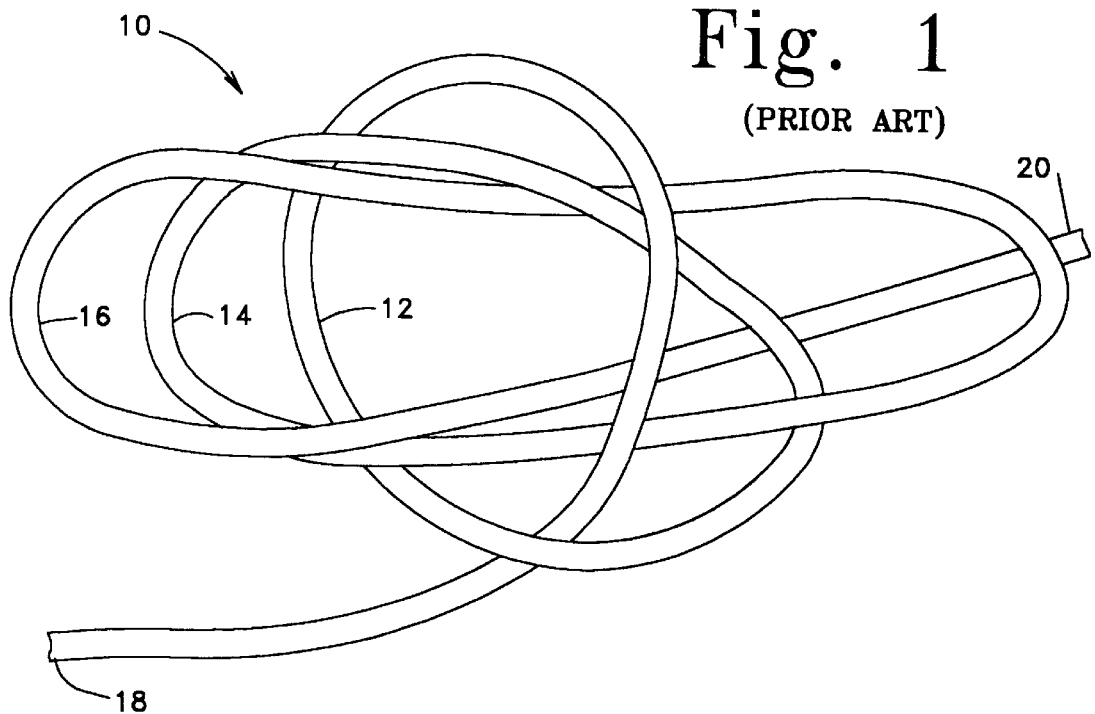
FIG. 1 is a plan view of a prior art long flexible substantially circular cross-sectional shaped member that is tangled.

Reference first is made to FIG. 1 of the drawings wherein a long flexible member 10 such as a hose, electrical cord, rope, or the like, is shown in a simple tangle including three coils 12, 14, and 16. Coil 12 is looped around coils 14 and 16, while coil 14 also is looped around coil 16. Opposite ends of member 10 are identified by reference numerals 18 and 20. Member 10 is not coded so it is difficult to determine what to do to untangle the same. Pulling on ends 18 and 20 without extracting the loops will tighten the tangle and result in a knot.

Figure 2:
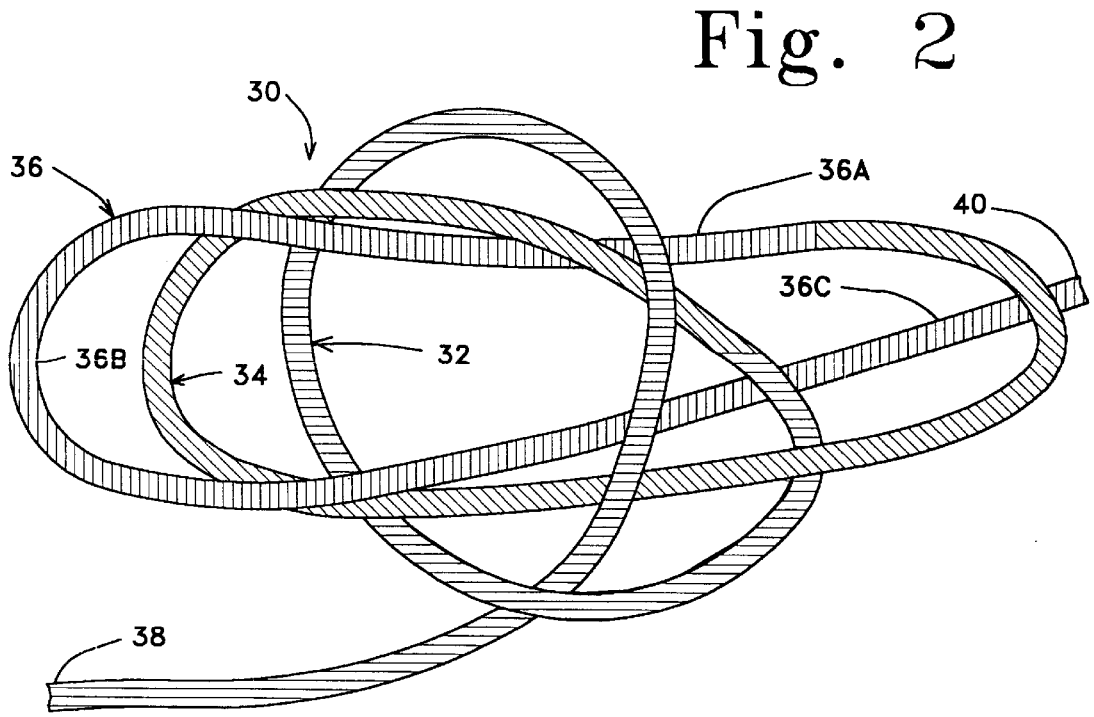
FIG. 2 is a plan view of a flexible member which is similar to that of FIG. 1 but showing non-alpha-numeric color coding of the member in accordance with this invention for greatly facilitating identification of individual coils and untangling thereof.

Reference now is made to FIG. 2 wherein a long flexible member 30 is shown that is tangled in the same manner as member 10 shown in FIG. 1. In FIG. 2, first, second and third coils 32, 34 and 36 and ends 38 and 40, correspond to first, second, and third coils 12, 14 and 16, and ends 18 and 20, in FIG. 1. Member 30 is provided with a color code, the manifestation of which continuously changes as its position on the member proceeds from one end 38 to opposite end 40. For purposes of illustration, coils 32, 34 and 36 are shown colored blue, green and red, respectively, each of which colors continuously varies, or changes, non-repetitively in one or more attributes such as hue, brilliance, saturation or purity, or the like, along the length thereof such that substantially every point along the length of member 30 is uniquely identified. By means of the non-alpha-numeric code, here a color code, individual coils can be easily identified. For example, coil 36, which comprises sections 36A and 36C connected by an intermediate section 36B is readily identified because of the continuously changing color coding. With sections 36A and 36C identified by the continuously changing color coding as comprising parts of coil 36, untangling may proceed by pulling coil 36 out from the surrounding coils 32 and 34. It will be noted that with the uncoded member 10 shown in FIG. 1, coil 16 thereof, which corresponds to coil 36 of coded member 30, is not nearly as easily identified and, as a result, untangling of uncoded member 10 is much more difficult and time consuming.

Figure 3:
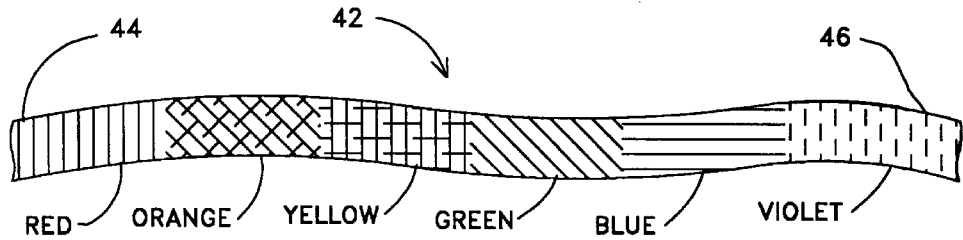
FIG. 3 is plan view of a long flexible substantially circular cross-sectional shaped member bearing a modified color code embodying the present invention, which coding comprises a gradual and continuous color change from one end of the visible spectrum to the other.

Reference now is made to FIG. 3 wherein a long flexible member 42 that is subject to tangling is shown, which member also is color coded in accordance with this invention, which code continuously changes non-repetitively as its position on member 42 proceeds from one end 44 to opposite end 46 of the member. Here, colors of the rainbow are used in substantially the correct rainbow color sequence of red, orange, yellow, green, blue and violet proceeding from end 44 to end 46 and, for convenience, the colors together with the continuous change within each color are labelled in the drawing. As with the FIG. 2 embodiment, each of the different colors (here, red, orange, yellow, green, blue and violet) continuously changes non-repetitively in one or more attributes such as hue, brilliance, saturation or purity, or the like, along the length of the color for uniquely identifying, non-alpha-numerically, substantially every point along the member.

Many means are available to accomplish color coding of the elongated members of FIGS. 2 and 3. A rope, for example, may be fabricated by use of filaments, or strands, of material dyed with the various colors that continuously change in one or more attributes. Alternately, the finished rope may be dyed with various colors that continuously change non-repetitively along the length thereof. Hoses sometimes are constructed with an inner tubular member, an intermediate reinforcing member of spirally wrapped nylon cord, or the like, and an outer translucent jacket. With such a construction, the spirally wrapped cord may be dyed with the desired continuously changing color, or colors, to provide the hose with a color code which continuously changes from one end of the hose to the other end, which colors can be seen through the outer translucent jacket. Obviously, the invention is not limited to any particular means for color coding long flexible members in accordance with the invention.

Figure 4:
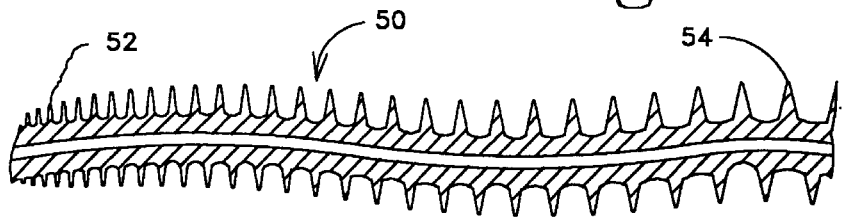
FIG. 4 is a plan view of a long flexible substantially circular cross-sectional shaped member showing a modified embodiment of this invention employing texture as the coding system.

Reference now is made to FIG. 4 wherein a modified form of this invention is shown comprising a long flexible member 50 that is subject to tangling which, for purposes of illustration, comprises a hose having opposite ends 52 and 54. A textural code comprising a texture which continuously changes non-repetitively from substantially smooth at end 52 to rough at end 54 is provided at the outer surface of member 50. The texture comprises both a visual and tactile code for identifying portions of the elongated flexible member either visually and/or by touch. With the textural code, substantially every point along the length of the hose is uniquely identified thereby facilitating untangling of the hose.

Figure 5:
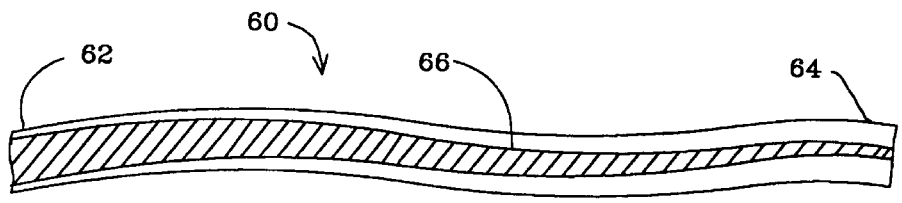
FIG. 5 is a plan view of a long flexible substantially circular cross-sectional shaped member showing a modified embodiment of this invention employing a longitudinally extending design as the non-alpha-numeric coding system.

Other embodiments of the invention utilize a substantially continuously changing pattern, or design, code. One such design code is shown in association with an elongated flexible member 60 in FIG. 5. The non-alpha-numeric code employed comprises one or more longitudinal bands that extend from one end 62 to the opposite end 64 of the member, and which continuously changes non-repetitively as its position on member 60 proceeds from end 62 to end 64. One such band 66 is shown in FIG. 5, the width of which continuously changes non-repetitively. Individual loops included in tangles formed in member 60 are readily visually identified by the width of band 66 forming the loop. Preferably, a plurality of longitudinally extending bands having the same taper are provided so that the visual code provided thereby is readily ascertained even when the elongated member is twisted and looped. As with the other embodiments, the tapered band, or bands, function to uniquely identify position at substantially every point along the length of the hose to facilitate untangling of the hose.

Figure 6:
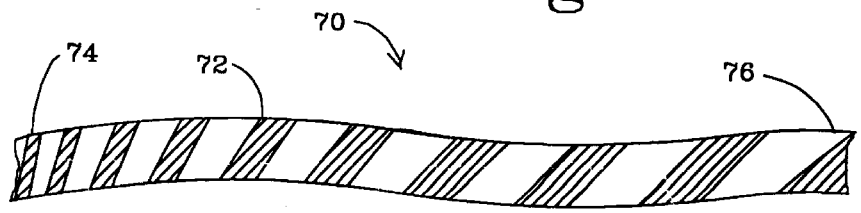
FIG. 6 is a plan view of a long flexible substantially circular cross-sectional shaped member showing an alternative embodiment of non-alpha-numeric design-type coding which extends helically along the member.

In FIG. 6 an elongated flexible member 70 which is subject to tangling is shown provided with a non-alpha-numeric design code in the form of a spiral band 72 that extends from one end 74 to the opposite end 76 of the member. For purposes of illustration, both the width and pitch of band 72 continuously increases as the position of the band on member 70 proceeds from end 74 to end 76 to provide member 70 with a design code that continuously changes from one end to the other of member 70. Both the continuously changing width and pitch of the visible code 72 uniquely identify position at substantially every point along the length of member thereby facilitating untangling of the member.

Although several embodiments of the invention are shown and described in detail, it will be apparent that various changes and modifications may suggest themselves to those skilled in the art. For example, members having a design code such as those shown in FIGS. 5 and 6, also may be color coded and/or texturally coded to further aid in untangling thereof. It is intended that these and other such changes and modifications may be made without departing from the spirit of the invention defined in the appended claims.

I claim:

1. A non-alpha-numeric coded item comprising, a long flexible substantially circular cross-sectional shaped member that is subject to tangling and having a first end and a second end, and a visible, non-alpha-numeric, code extending along the length of said member which code substantially continuously changes non-repetitively from said first end to said second end for uniquely identifying position at substantially every point along the length of the member to facilitate untangling of the member.

2. A non-alpha-numeric coded item as defined in claim 1 wherein said member comprises a hose.

3. A non-alpha-numeric coded item as defined in claim 1 wherein said member comprises an electrical cord.

4. A non-alpha-numeric coded item as defined in claim 1 wherein said member comprises a rope.

5. A non-alpha-numeric coded item as defined in claim 1 wherein said visible, non-alpha-numeric, code comprises a color code that includes at least one color, said at least one color having at least one color attribute of said color which color attribute substantially continuously changes along the length of the member.

6. A non-alpha-numeric coded item as defined in claim 5 wherein said color attribute which substantially continuously changes comprises hue.

7. A non-alpha-numeric coded item as defined in claim 5 wherein said color attribute which substantially continuously changes comprises brilliance.

8. A non-alpha-numeric coded item as defined in claim 5 wherein said color attribute which substantially continuously changes comprises saturation.

9. A non-alpha-numeric coded item as defined in claim 5 wherein said color code comprises colors of the rainbow each of which colors substantially continuously changes.

10. A non-alpha-numeric coded item as defined in claim 1 wherein said non-alpha-numeric code comprises a textural code comprising texture which changes from said first end to said second end.

11. A non-alpha-numeric coded item as defined in claim 10 wherein said texture changes from smooth to rough from said first end to said second end.

12. A non-alpha-numeric coded item as defined in claim 1 wherein said non-alpha-numeric code comprises a design code comprising a design which changes from said first end to said second end.

13. A non-alpha-numeric coded item as defined in claim 12 wherein said design code comprises a longitudinally extending stripe which changes from wide to thin from said first end to said second end.

14. A non-alpha-numeric coded item as defined in claim 12 wherein said design code comprises a spiral stripe which changes from wide to thin from said first end to said second end.

15. A non-alpha numeric coded item as defined in claim 12 wherein said design code comprises a spiral stripe the pitch of which changes from small to large from said first end to said second end.

* * * * *